US012785158B2

(12) United States Patent
Wiebenga et al.

(10) Patent No.: US 12,785,158 B2
(45) Date of Patent: Nov. 3, 2026

(54) EARLY DETECTION OF CELL VENT RUPTURE WITH BATTERY CELL IDENTIFICATION

(71) Applicant: GM GLOBAL TECHNOLOGY OPERATIONS LLC, Detroit, MI (US)

(72) Inventors: Michelle H. Wiebenga, Farmington Hills, MI (US); Rashmi Prasad, Troy, MI (US); Vamakshi Yadav, Sterling Heights, MI (US); Lei Wang, Rochester Hills, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 730 days.

(21) Appl. No.: 18/327,484

(22) Filed: Jun. 1, 2023

(65) Prior Publication Data

US 2024/0405298 A1 Dec. 5, 2024

(51) Int. Cl.

| | |
|---|---|
| ***H01M 10/42*** | (2006.01) |
| ***H01M 10/48*** | (2006.01) |
| ***H01M 50/103*** | (2021.01) |
| ***H01M 50/209*** | (2021.01) |
| ***H01M 50/342*** | (2021.01) |

(52) U.S. Cl.

CPC ....... *H01M 10/425* (2013.01); *H01M 10/482* (2013.01); *H01M 10/486* (2013.01); *H01M 50/103* (2021.01); *H01M 50/209* (2021.01); *H01M 50/3425* (2021.01); *H01M 2010/4278* (2013.01)

(58) Field of Classification Search

CPC ............. H01M 10/425; H01M 10/482; H01M 10/486; H01M 50/209; H01M 50/3425; H01M 50/103

See application file for complete search history.

(56) References Cited

U.S. PATENT DOCUMENTS

2013/0071706 A1* 3/2013 Lee ..................... H01M 10/486 429/62
2020/0266405 A1* 8/2020 Pokora ................ H01M 10/486

OTHER PUBLICATIONS

Sadler et al., "on-chip_eddy_current_sensor_for_proximity_sensing_and_crack_detection", p. 340-345 (Year: 2001).*
U.S. Appl. No. 17/522,553, filed Nov. 9, 2021, Wang et al.
U.S. Appl. No. 18/073,000, filed Dec. 1, 2022, Wiebenga et al.
U.S. Appl. No. 18/073,021, filed Dec. 1, 2022, Wiebenga et al.
D. J. Sadler, C. H. Ahn. "On-chip eddy current sensor for proximity sensing and crack detection". Sensors and Actuators A: Physical, vol. 91, Issue 3, 2001, p. 340-345.

* cited by examiner

*Primary Examiner* — Jimmy Vo

(57) ABSTRACT

A system for detecting bulging or rupturing of a vent cap includes a battery cell including a rigid enclosure, first and second terminals, and a vent cap. A first sensor is arranged adjacent to the vent cap and configured to sense a parameter affected by rupturing of the vent cap. A controller is configured to compare the parameter to a predetermined parameter and to detect rupturing of the vent cap in response to the comparison.

20 Claims, 8 Drawing Sheets

EARLY DETECTION OF CELL VENT RUPTURE WITH BATTERY CELL IDENTIFICATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for detecting cell vent rupture with battery cell identification.

Electric vehicles (EVs) such as battery electric vehicles (BEVs), hybrid vehicles, and/or fuel cell vehicles include one or more electric machines and a battery system including one or more battery cells, modules and/or packs. A power control system is used to control charging and/or discharging of the battery system during charging and/or driving. Manufacturers of EVs are pursuing increased power density to increase the range of the EVs.

SUMMARY

A system for detecting bulging or rupturing of a vent cap includes a battery cell including a rigid enclosure, first and second terminals, and a vent cap. A first sensor is arranged adjacent to the vent cap and configured to sense a parameter affected by rupturing of the vent cap. A controller is configured to compare the parameter to a predetermined parameter and to detect rupturing of the vent cap in response to the comparison.

In other features, the first sensor comprises a gas sensor configured to sense a concentration of one or more gases exiting the vent cap. The one or more gases are selected from a group consisting of molecular hydrogen (H2), carbon monoxide (CO), carbon dioxide (CO2), and ethylene. The first sensor comprises a temperature sensor configured to sense a temperature of vent gases exiting the vent cap. The first sensor comprises a pressure sensor configured to sense pressure of vent gases exiting the vent cap. The first sensor comprises a wire sensor including a wire traversing a portion of the vent cap.

In other features, the wire sensor further includes a resistor connected to the wire and a voltage source connected to the resistor. The first sensor comprises an eddy current sensor. The first sensor comprises a strain gauge sensor. The strain gauge sensor includes a flexible substrate and a conductive layer arranged on the flexible substrate in a predetermined pattern.

In other features, a temperature sensor is configured to sense a temperature of vent gas exiting the vent cap. The first sensor is selected from a group consisting of a wire sensor, a pressure sensor, a temperature sensor, an eddy current sensor, and a strain gauge sensor. The controller is configured to detect rupturing of the vent cap based on the parameter output by the first sensor. The controller is configured to selectively detect a thermal runaway event in response to the rupturing of the vent cap and a comparison between the sensed temperature and a predetermined temperature.

A battery system for detecting bulging or rupturing of a vent cap includes C battery cells, where C is an integer greater than or equal to one. Each of the C battery cells includes a rigid enclosure, first and second terminals, a vent cap, and a first sensor arranged adjacent to the vent cap and configured to sense a parameter affected by rupturing of the vent cap. A controller is configured to compare the parameter generated by the first sensor for the C battery cells to predetermined thresholds, respectively, and detect rupturing of the vent cap for a respective one of the C battery cells in response to the comparisons.

In other features, the first sensor comprises a gas sensor configured to sense a concentration of one or more gases exiting the vent cap. The one or more gases are selected from a group consisting of molecular hydrogen (H2), carbon monoxide (CO), carbon dioxide (CO2), and ethylene. The first sensor comprises a temperature sensor configured to sense a temperature of vent gases exiting the vent cap of a respective one of the C battery cells. The first sensor comprises a pressure sensor configured to sense a pressure of vent gases exiting the vent cap of a respective one of the C battery cells. The first sensor comprises a wire sensor including a wire traversing the vent cap of a respective one of the C battery cells and the wire is broken in response to rupturing of the vent cap. The first sensor comprises an eddy current sensor configured to sense deformation of the vent cap of a respective one of the C battery cells.

In other features, the first sensor comprises a strain gauge configured to sense deformation of a respective one of the C battery cells. A temperature sensor is configured to sense a temperature of vent gas exiting the vent cap. The first sensor is selected from a group consisting of a wire sensor, a pressure sensor, a temperature sensor, an eddy current sensor, and a strain gauge sensor. The controller is configured to detect rupturing of the vent cap based on the parameter output by the first sensor. The controller is configured to selectively detect a thermal runaway event in response to the rupturing of the vent cap and a comparison between the sensed temperature and a predetermined temperature.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

While the batteries and battery cells according to the present disclosure are described below in the context of a vehicle, the batteries and battery cells can be used in stationary applications and/or other applications.

Early detection of rupturing of the vent cap, such as in the case of a thermal runaway event, improves operation and safety of lithium-ion batteries for EVs. The present disclosure relates to systems and methods including one or more sensors for detecting rupturing of the vent cap and/or thermal runaway.

In some examples, the sensor includes a wire that is arranged across the vent cap. When the vent cap ruptures, the wire is broken. The sensor detects when the wire is broken.

During lead-up to thermal runaway, concentrations of one or more gases (e.g., molecular hydrogen ($H_2$), carbon monoxide (CO), carbon dioxide ($CO_2$), ethylene, etc.) in the battery cell increase. In some examples, the sensor includes a gas sensor arranged on the enclosure of the battery cell near the vent cap. The gas sensor is configured to sense vent gases that are released when the vent cap ruptures. A controller is configured to compare the measured concentration of one or more gases to predetermined thresholds and to selectively detect rupturing of the vent cap in response to the comparison.

In other examples, the sensor includes a temperature sensor is arranged near the vent cap (e.g., mounted directly on the vent cap, over the vent cap, or immediately adjacent to the vent cap). The temperature sensor is configured to sense an increase in temperature caused by heated vent gases exiting the ruptured vent cap.

In other examples, the sensor includes a strain gauge sensor arranged on or above the vent cap. When the vent cap bulges or ruptures, the strain gauge senses deformation of the vent cap. In some examples, the sensor includes an eddy current sensor arranged near the vent cap. When the vent cap bulges or ruptures, the eddy current sensor senses deformation of the vent cap.

Since each of the battery cells includes a sensor, the controller is able to identify the specific battery cell(s) with the vent cap that is ruptured (and the identity/location of the failed battery cell(s)). This, in turn, provides the manufacturer with more precise information to allow diagnosis of one or more problems causing the failure (which may or may not depend on location). In some examples, the controller performs diagnostics/remedial action in response to rupturing of the vent cap.

In some examples, one of the sensors described above is used in conjunction with a temperature sensor. When the sensor detects bulging or rupturing of the vent cap, the temperature sensor can be used to determine whether the failure is due to a thermal runaway event or other causes such as battery cell aging or damage due to an accident or other cause.

Figure 1:
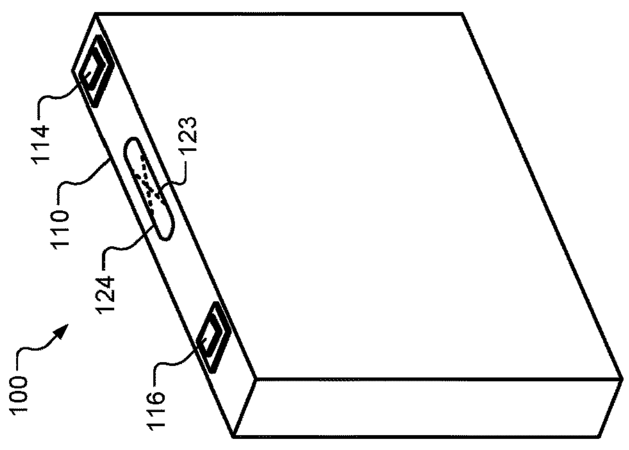
FIG. 1 is a perspective view of an example of a battery cell including a rigid enclosure, electrode terminals, and a vent cap.

Referring now FIG. 1, a battery cell 100 includes an enclosure 110, first and second terminals 114 and 116, and a vent cap 124. In some examples, the enclosure 110 comprises a rigid enclosure such as a prismatic enclosure, a cylindrical enclosure, or other form factors. In some examples, the vent cap 124 is made of metal such as aluminum and includes a pattern of perforations 123 to ensure that the vent cap 124 ruptures at a predetermined pressure within the rigid enclosure.

Figure 2B:
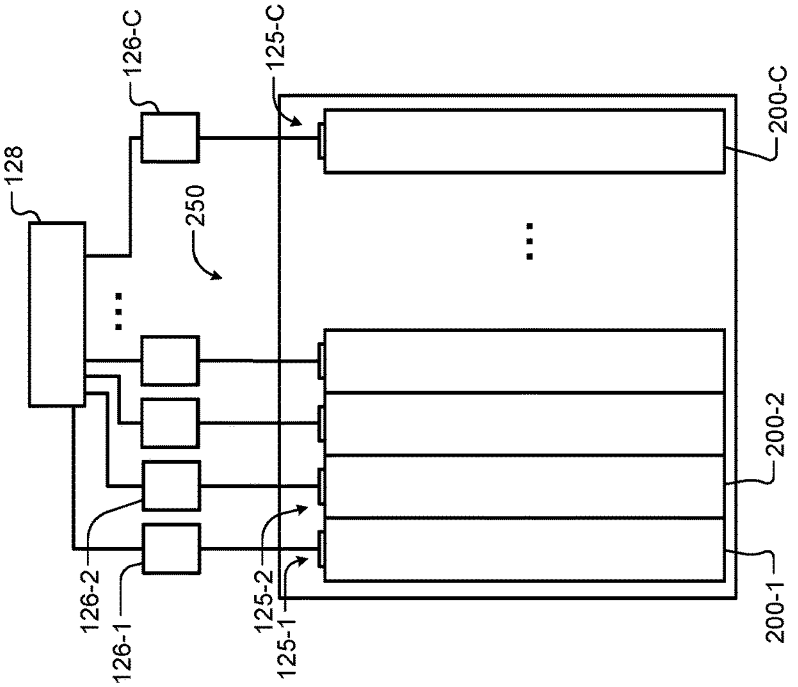
FIG. 2B is a functional block diagram of a battery module including a plurality of battery cells each including a wire sensor according to the present disclosure.
Figure 2A:
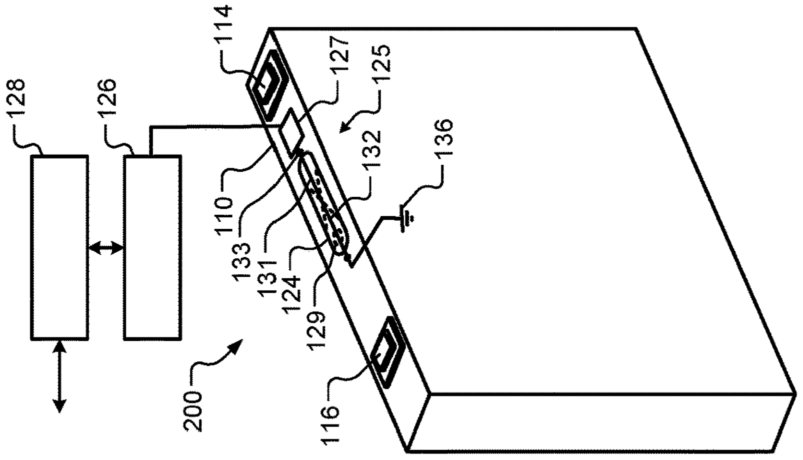
FIG. 2A is a perspective view of an example of a battery cell including a rigid enclosure, electrode terminals, a vent cap, and a wire sensor configured to sense rupturing of the vent cap according to the present disclosure.

Referring now FIGS. 2A and 2B, a battery cell 200 includes the enclosure 110, the first and second terminals 114 and 116, and the vent cap 124. In FIG. 2A, the battery cell 200 further includes a wire sensor 125. The wire sensor 125 senses rupturing of the vent cap 124. The wire sensor 125 includes a wire 132 that traverses a portion of the vent cap 124. For example, adhesive or fastener 133 may be used to bond the wire 132 on opposite lateral or longitudinal sides of the vent cap 124. In some examples, the wire 132 includes a conductor and an outer insulating layer 131 that insulates the wire 132. In other examples, a bare conductor is used and an insulating layer 129 is arranged between the wire 132 and the vent cap 124.

In some examples, one end of the wire 132 is connected to ground 136 and another end of the wire 132 is connected to a resistor 127. Ground 136 can be provided by one of the terminals, the controller 128 or another ground reference. The resistor 127 is connected to a voltage source or a sensor 126. When the wire breaks, both voltage, current, and/or resistance of the wire 132 change. The controller 128 is configured to monitor a parameter (e.g., voltage, current, and/or resistance) of the wire 132 and to selectively detect rupturing of the vent cap 124 by comparing the measured parameter to a predetermined threshold.

In FIG. 2B, a battery module 250 includes C of the battery cells 200, where C is an integer greater than zero. The battery module 250 includes C of the sensors 126 (e.g., 126-1, 126-2, . . . , and 126-C) configured to monitor C of the wire sensors 125 (e.g., 125-1, 125-2, . . . , and 125-C). The controller 128 is configured to monitor the sensors 126, compare the sensed parameters from the sensors 126 to a predetermined thresholds, and selectively declare rupturing of the vent cap and its identification and location in response to the comparison.

Figure 3A:
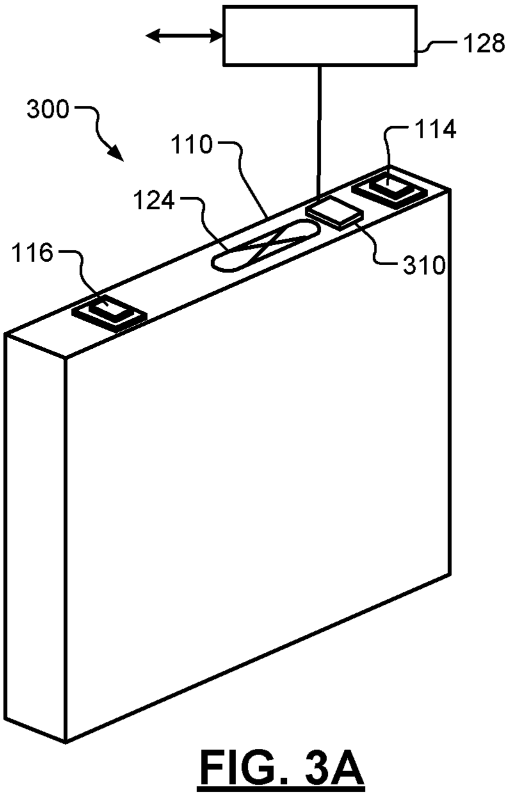
FIGS. 3A and 3B are perspective views of example of a battery cell including a rigid enclosure, electrode terminals, a vent cap, and a gas sensor to sense one or more vent gases exiting the vent cap according to the present disclosure.
Figure 3B:
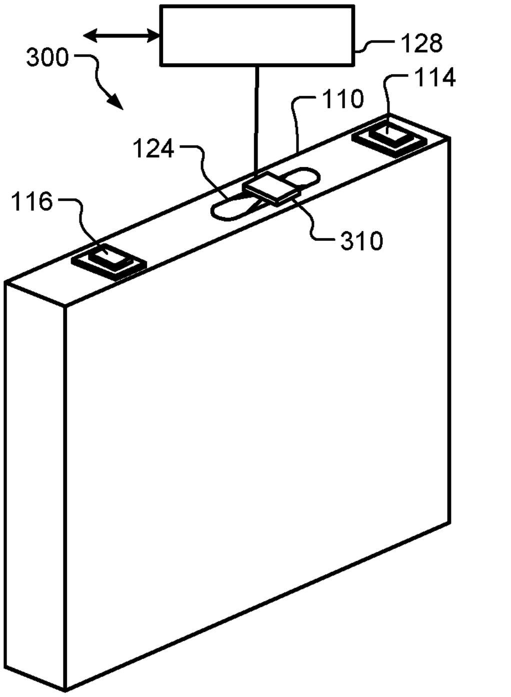

Referring now FIGS. 3A to 3D, a battery cell 300 includes the enclosure 110, the first and second terminals 114 and 116, and the vent cap 124. In FIGS. 3A and 3B, the battery cell 300 further includes a gas sensor 310 to sense gas concentrations of one or more gases near the vent cap 124. In some examples, the gas sensor 310 senses a concentration and/or rate of change of a concentration of gases exiting the vent cap after rupture. In some examples, the gas sensor senses concentrations of one or more gases selected from a group consisting of molecular hydrogen ($H_2$), carbon monoxide (CO), carbon dioxide ($CO_2$), and/or ethylene. When the level or rate of change is greater than a predetermined level or rate of change, an event is declared for the corresponding battery cell. In some examples, the controller 128 declares rupturing of the vent cap in response to $H_2$ levels greater than 10 ppm. In some examples, the controller 128 detects rupturing of the vent cap in response to $CO_2$ levels greater than 1000 ppm. In FIG. 3A, the gas sensor 310 is arranged on the enclosure 110 adjacent to the vent cap 124. In FIG. 3B, the gas sensor 310 is arranged on the enclosure 110 on or above the vent cap 124.

Figure 3C:
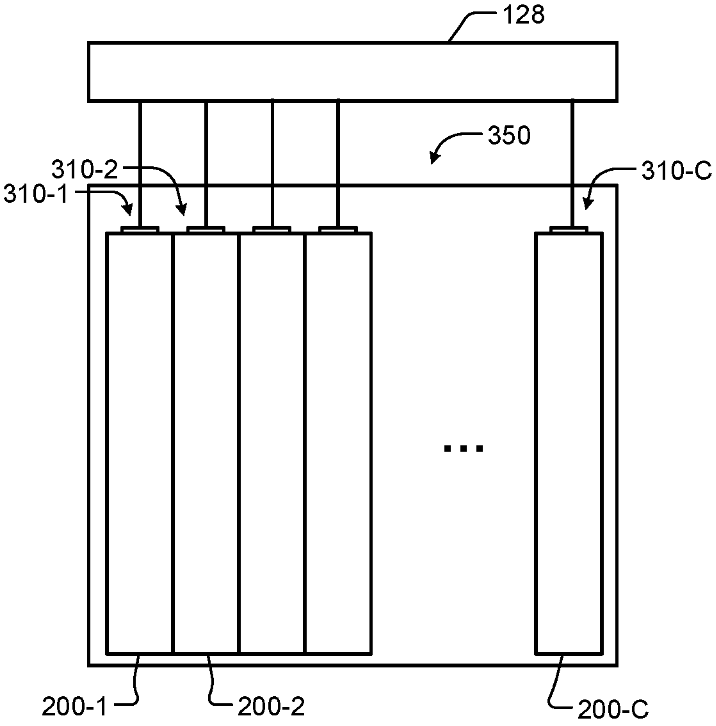
FIG. 3C is a functional block diagram of a battery module including a plurality of gas sensors according to the present disclosure.

In FIG. 3C, a battery module 350 includes C of the battery cells 300, where C is an integer greater than zero. The controller 128 communicates with C of the gas sensors 310 (e.g., 310-1, 310-2, . . . , and 310-C). The controller 128 compares the sensed signals from the gas sensors 310 to a predetermined level or rate of change and selectively detects rupturing of the vent cap in response to the comparison.

Figure 3D:
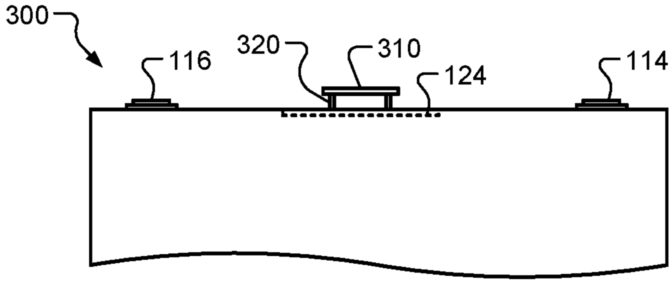
FIG. 3D is a functional block diagram of a battery cell including a sensor mounted above and spaced from a vent cap according to the present disclosure.

The sensors described herein can be mounted directly over the vent cap 124 as shown, on the battery enclosure adjacent to the vent cap 124, and/or over and spaced from the vent cap 124. In FIG. 3D, the gas sensor 310 is mounted on a support 320 that locates the gas sensor 310 spaced from the vent cap 124.

Figure 4:
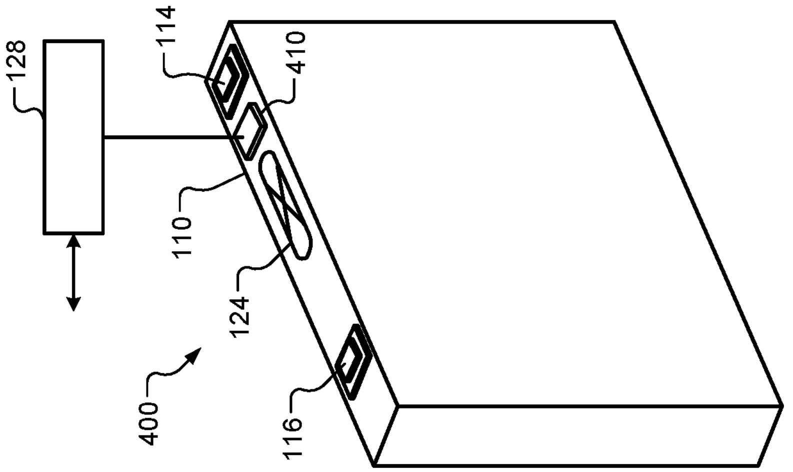
FIG. 4 is a perspective view of an example of a battery cell including an enclosure, electrode terminals, a vent cap, and a temperature sensor configured to sense a temperature of vent gases exiting the vent cap according to the present disclosure.

Referring now FIG. 4, a battery cell 400 includes the enclosure 110, the first and second terminals 114 and 116, and the vent cap 124. The battery cell 300 further includes a temperature sensor 410 configured to sense a temperature increase near the vent cap 124 in response to vent gases escaping through the vent cap 124 after rupture. When the measured temperature is greater than a predetermined temperature, rupturing of the vent cap is detected for the corresponding battery cell. In some examples, the predetermined temperature is greater than 70° C., although higher or lower temperatures can be used. The temperature sensor 410 can be arranged on the enclosure 110 adjacent to the vent cap 124 as shown or on or above the vent cap 124 as shown above in FIG. 3B.

Figure 5:
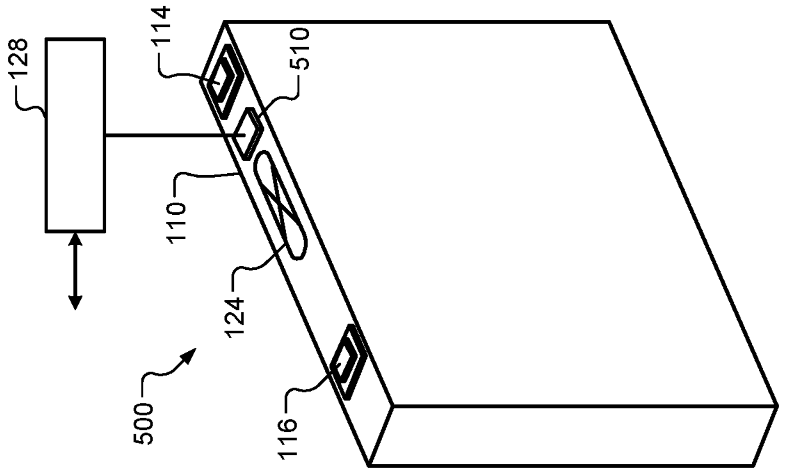
FIG. 5 is a perspective view of an example of a battery cell including an enclosure, electrode terminals, a vent cap, and a pressure sensor configured to sense pressure of vent gases exiting the vent cap according to the present disclosure.

Referring now FIG. 5, a battery cell 500 includes the enclosure 110, the first and second terminals 114 and 116, and the vent cap 124. The battery cell 500 further includes a pressure sensor 510 to sense pressure increase near the vent cap 124 in response to vent gases escaping through the vent cap 124 after rupture. When the measured pressure is greater than a predetermined pressure, rupturing of the vent cap is detected for the corresponding battery cell. The pressure sensor 510 can be arranged on the enclosure 110 adjacent to the vent cap 124 as shown or on or above the vent cap 124 as shown above in FIG. 3B.

Figure 6A:
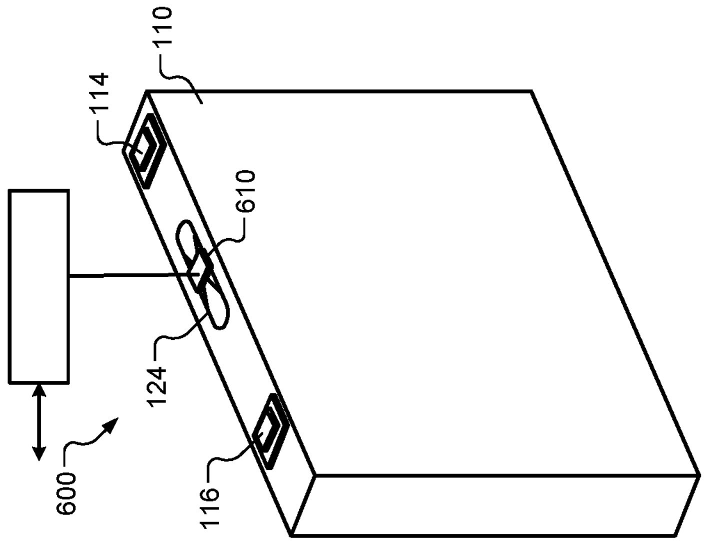
FIG. 6A is a perspective view of an example of a battery cell including an enclosure, electrode terminals, a vent cap, and a strain gauge sensor configured to sense deformation of the vent cap according to the present disclosure.
Figure 6B:
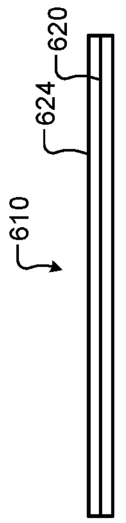
FIG. 6B is a side cross-sectional view of an example of the strain gauge sensor according to the present disclosure.
Figure 6C:
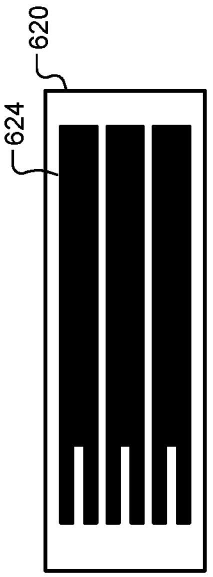
FIG. 6C is a plan view of the example of the strain gauge sensor of FIG. 6B.

Referring now FIGS. 6A to 6C, a battery cell 600 includes the enclosure 110, the first and second terminals 114 and 116, and the vent cap 124. The battery cell 600 further includes a strain gauge sensor 610 configured to sense deformation of the vent cap 124 prior to rupturing of the vent cap 124. In FIGS. 6B and 6C, an example of the strain gauge sensor 610 is shown. The strain gauge sensor 610 includes a flexible substrate 620 and a conductive layer 624 arranged on the flexible substrate. The conductive layer 624 is arranged in a predetermined pattern. As the strain gauge sensor 610 is deformed due to the vent cap 124, one or more measurable electrical parameters of the strain gauge sensor 610 (e.g., impedance, resistance, voltage, current, etc.) vary in response to the deformation of the vent cap 124. The controller 128 compares the one or more measurable electrical parameters to one or more predetermined values or rates of change and selectively detects rupturing of the vent cap for the corresponding battery cell.

Figure 7A:
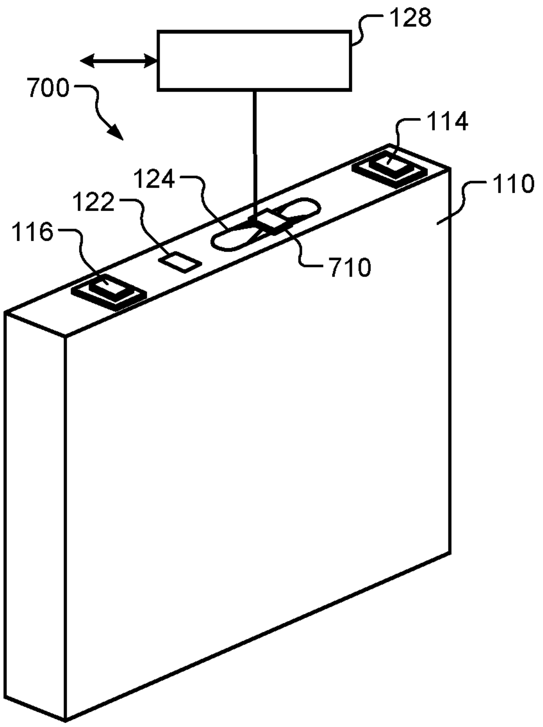
FIGS. 7A and 7B are perspective view of examples of a battery cell including an enclosure, electrode terminals, a vent cap, and an eddy current sensor to sense deformation of the vent cap according to the present disclosure.
Figure 7B:
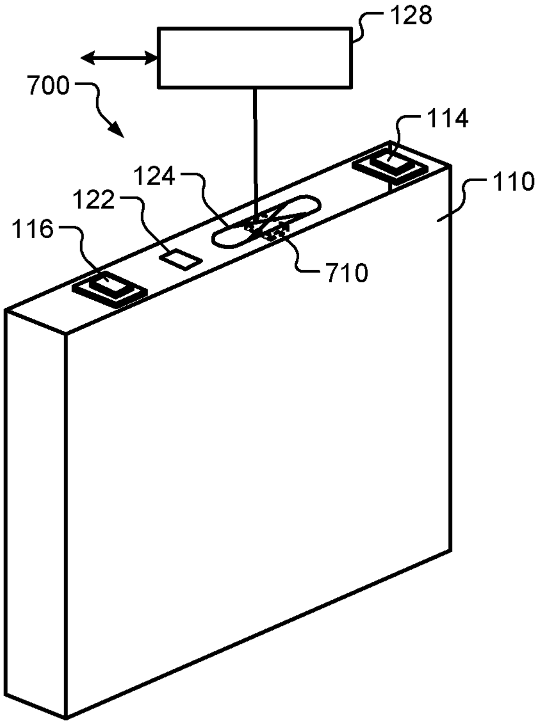
Figure 7C:
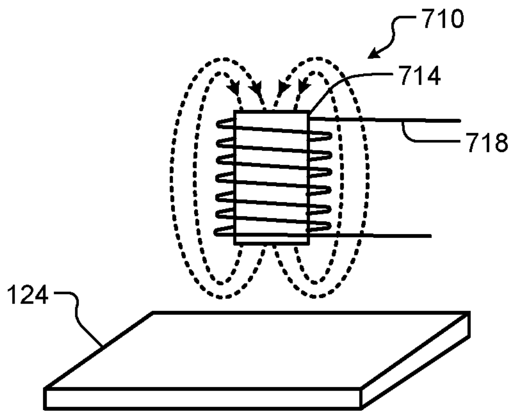
FIG. 7C illustrates an example of the eddy current sensor according to the present disclosure.

Referring now FIGS. 7A to 7C, a battery cell 700 includes an enclosure 110, the first and second terminals 114 and 116, and the vent cap 124. The battery cell 700 further includes an eddy current sensor 710 to sense deformation of the vent cap 124. In FIG. 7A, the eddy current sensor 710 is arranged on or above the vent cap 124. In FIG. 7B, the eddy current sensor 710 is arranged in the enclosure below the vent cap 124. In FIG. 7C, the eddy current sensor 710 is arranged near the vent cap 124. The eddy current sensor 710 includes a core 714 and a wire 718 wound around the core 714. Eddy currents are formed when a moving or changing magnetic field intersects a conductor (such as the vent cap 124) or vice versa. The relative motion causes current to flow within the conductor. The circulating eddies of current create magnetic fields that oppose the effect of an applied magnetic field. The stronger the applied magnetic field, or greater the electrical conductivity of the conductor, or greater the relative velocity of motion, the greater the currents developed and greater the opposing field. The eddy current sensor 710 senses formation of secondary fields to estimate a distance between the eddy current sensor 710 and the vent cap 124.

As the vent cap 124 is deformed, the vent cap 124 moves or a distance between the vent cap 124 and the eddy current sensor 710 changes. The changes affect a magnetic field generated by the eddy current sensor 710. The controller 128 compares the one or more measurable electrical parameters output by the eddy current sensor 710 to one or more predetermined values or rates of change and selectively detects rupturing of the vent cap 124 for the corresponding battery cell.

Figure 8:
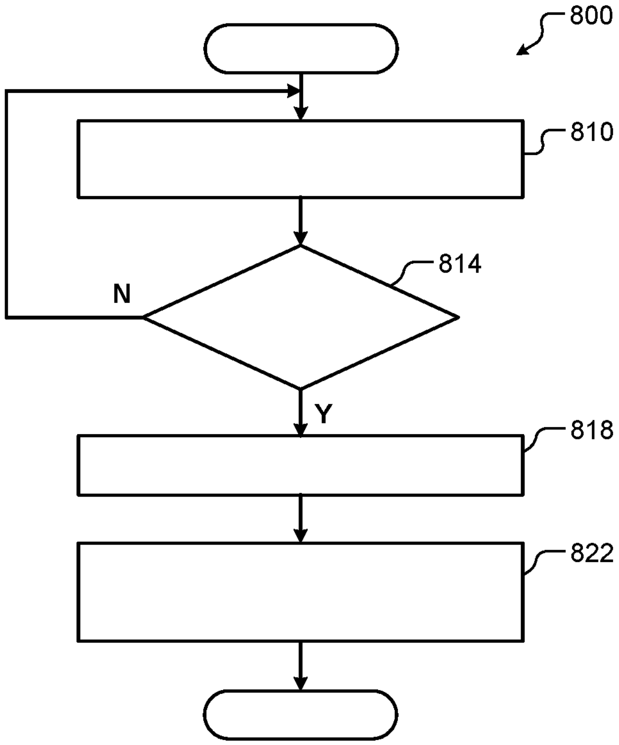
FIG. 8 is a flowchart of an example of a method for sensing rupturing of a vent cap of a battery cell according to the present disclosure.

Referring now to FIG. 8, a method 800 for detecting rupturing of the vent cap is shown. At 810, the method monitors the sensor associated with each of the battery cells. At 814, the method compares the sensor signal (or a signal based on the sensor signal (such as an average during a window, a rate of change, or other function based on the sensor signal)) to a predetermined threshold. If the sensor signal is greater than the threshold, the method detects rupturing of the vent cap at 818. At 822, the method performs one or more mitigation actions. For example, cooling to the battery cell can be increased, power output by the battery can be restricted, vehicle shutdown can be initiated, or other actions can be taken.

Figure 9:
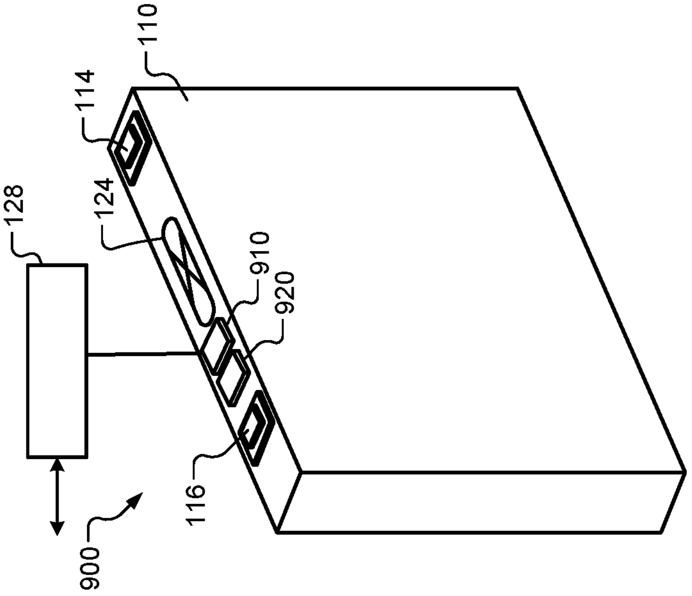
FIG. 9 is a perspective view of an example of a battery cell including an enclosure, electrode terminals, a vent cap, a first sensor, and a temperature sensor according to the present disclosure.

Referring now to FIG. 9, the vent cap 124 can rupture for reasons other than a developing thermal runaway event. For example, the vent cap 124 can rupture due to aging of the battery cell and/or damage caused by an accident. In FIG. 9, a temperature sensor 910 is used in conjunction with another sensor 920 (e.g., one of the non-temperature sensors described above). As in the preceding examples, the temperature sensor 910 and the sensor 920 can be arranged on, adjacent to, over or under the vent cap 124. Output of the sensor 920 is used to detect rupturing of the vent cap 124. The temperature sensor 910 is used to detect whether or not the cause of the rupturing of the vent cap 124 is due to a potential thermal runaway event.

For example, the controller 128 declares a first event when the vent cap 124 ruptures and the sensed temperature is less than a predetermined temperature. The controller 128 declares a second event when the vent cap 124 ruptures and the sensed temperature is greater than a predetermined temperature. The first event may be associated with a lower level of action (e.g., detect rupture, set a service light, request or recommend service, and/or reporting incident via a telematics system). The second event may be associated with more aggressive mitigation actions (e.g., cooling to the battery cell can be increased, power output by the battery can be restricted, vehicle shutdown can be initiated, or other actions can be taken).

Figure 10:
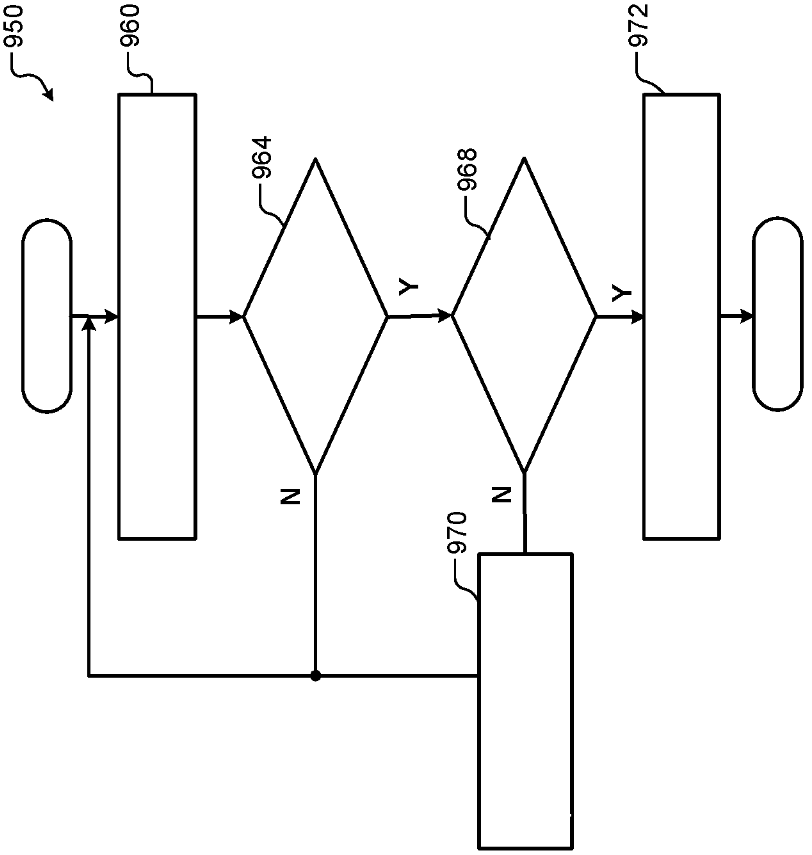
FIG. 10 is a flowchart of another example of a method for sensing rupturing of a vent cap of a battery cell according to the present disclosure.

Referring now to FIG. 10, a method 950 for detecting rupturing of the vent cap is shown. At 960, the method monitors the sensor associated with each of the battery cells. At 964, the method compares the sensor signal (or a signal based on the sensor signal) to a predetermined threshold TH1. At 968, the method compares the sensed temperature to a predetermined temperature TH2. If the sensed temperature is less than or equal to the predetermined temperature TH2, the method detects rupturing of the vent cap and performs a first action at 970. For example, the first action may include one or more of setting a diagnostic code, turning on a service light, increasing cooling to the battery cell, reducing power output by the battery cell, or other actions.

If the sensed temperature is greater than the predetermined temperature TH2, the method detects rupturing of the vent cap at 972 and performs a second action at 976. In some examples, the first actions are the same as the second actions. In other examples, the first actions are different than the second actions. For example, the second action may include one or more of setting a diagnostic code, turning on a service light, increasing cooling to the battery cell, reducing power output by the battery cell, shutting down the vehicle, or other actions.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for detecting bulging or rupturing of a vent cap, comprising:
- a battery cell including a rigid enclosure, first and second terminals, and a vent cap;
- a first sensor arranged adjacent to the vent cap and configured to sense a parameter affected by rupturing of the vent cap, the first sensor including at least one of a wire, a strain gauge sensor or a gas sensor; and
- a controller configured to compare the parameter to a predetermined parameter and to detect rupturing of the vent cap in response to the comparison,
- in response to detecting rupturing of the vent cap, detect a temperature via a temperature sensor adjacent the vent cap,
- execute at least one of setting a service light, requesting service, or reporting an incident via a telematics system, in response to the temperature being below a threshold, and
- execute at least one of increasing cooling to the battery, restricting power output by the battery, or initiating shutdown of a vehicle including the battery, in response to the temperature being above the threshold.

2. The system of claim 1, wherein the first sensor comprises the gas sensor configured to sense a concentration of one or more gases exiting the vent cap.

3. The system of claim 2, wherein the one or more gases are selected from a group consisting of molecular hydrogen ($H_2$), carbon monoxide (CO), carbon dioxide ($CO_2$), and ethylene.

4. The system of claim 1, wherein the first sensor comprises a second temperature sensor configured to sense the temperature of vent gases exiting the vent cap.

5. The system of claim 1, wherein the first sensor comprises a pressure sensor configured to sense pressure of vent gases exiting the vent cap.

6. The system of claim 1, wherein the first sensor comprises a wire sensor including the wire traversing a portion of the vent cap.

7. The system of claim 6, wherein the wire sensor further includes:
- a resistor connected to the wire; and
- a voltage source connected to the resistor.

8. The system of claim 1, wherein the first sensor comprises an eddy current sensor.

9. The system of claim 1, wherein the first sensor comprises the strain gauge sensor.

10. The system of claim 9, wherein the strain gauge sensor includes a flexible substrate and a conductive layer arranged on the flexible substrate in a predetermined pattern.

11. The system of claim 9, further comprising:
- a second temperature sensor configured to sense the temperature of vent gas exiting the vent cap,
- wherein the controller is configured to detect rupturing of the vent cap based on the parameter output by the first sensor, and
- wherein the controller is configured to selectively detect a thermal runaway event in response to the rupturing of the vent cap and a comparison between the sensed temperature and a predetermined temperature.

12. A battery system for detecting bulging or rupturing of a vent cap, comprising:
- C battery cells, where C is an integer greater than or equal to one, wherein each of the C battery cells includes:
  - a rigid enclosure,
  - first and second terminals,
  - a vent cap, and
  - a first sensor arranged adjacent to the vent cap and configured to sense a parameter affected by rupturing of the vent cap, the first sensor including at least one of a wire, a strain gauge sensor or a gas sensor; and
- a controller configured to,
  - compare the parameter generated by the first sensor for the C battery cells to predetermined thresholds, respectively, and detect rupturing of the vent cap for a respective one of the C battery cells in response to the comparisons,
  - in response to detecting rupturing of the vent cap, detect a temperature via a temperature sensor adjacent the vent cap,
  - execute at least one of setting a service light, requesting service, or reporting an incident via a telematics system, in response to the temperature being below a threshold, and
  - execute at least one of increasing cooling to the C battery cells, restricting power output by the C battery cells, or initiating shutdown of a vehicle including the C battery cells, in response to the temperature being above the threshold.

13. The battery system of claim 12, wherein the first sensor comprises the gas sensor configured to sense a concentration of one or more gases exiting the vent cap.

14. The battery system of claim 13, wherein the one or more gases are selected from a group consisting of molecular hydrogen ($H_2$), carbon monoxide (CO), carbon dioxide ($CO_2$), and ethylene.

15. The battery system of claim 12, wherein the first sensor comprises a second temperature sensor configured to sense the temperature of vent gases exiting the vent cap of a respective one of the C battery cells.

16. The battery system of claim 12, wherein the first sensor comprises a pressure sensor configured to sense a pressure of vent gases exiting the vent cap of a respective one of the C battery cells.

17. The battery system of claim 12, wherein the first sensor comprises a wire sensor including the wire traversing the vent cap of a respective one of the C battery cells and the wire is broken in response to rupturing of the vent cap.

18. The battery system of claim 12, wherein the first sensor comprises an eddy current sensor configured to sense deformation of the vent cap of a respective one of the C battery cells.

19. The battery system of claim 12, wherein the first sensor comprises the strain gauge configured to sense deformation of a respective one of the C battery cells.

20. The battery system of claim 12, further comprising:

a second temperature sensor configured to sense the temperature of vent gas exiting the vent cap, wherein the controller is configured to detect rupturing of the vent cap based on the parameter output by the first sensor, and wherein the controller is configured to selectively detect a thermal runaway event in response to the rupturing of the vent cap and a comparison between the sensed temperature and a predetermined temperature.

* * * * *